United States Patent [19]

Ma

[11] Patent Number: 5,614,717
[45] Date of Patent: Mar. 25, 1997

[54] PYROELECTRIC INFRARED RAY SENSOR

[75] Inventor: Seong U. Ma, Seoul, Rep. of Korea

[73] Assignee: Samsung Electro-Mechanics Co., Ltd., Kyongki-do, Rep. of Korea

[21] Appl. No.: 536,733

[22] Filed: Sep. 29, 1995

[30] Foreign Application Priority Data

Sep. 30, 1994 [KR] Rep. of Korea .................. 1994-25013

[51] Int. Cl.$^6$ ...................................................... G01J 5/02
[52] U.S. Cl. ...................................................... 250/338.3
[58] Field of Search ........................................... 250/338.3

[56] References Cited

U.S. PATENT DOCUMENTS

| | | | |
|---|---|---|---|
| 4,933,559 | 6/1990 | Tamura et al. | 250/338.3 |
| 5,008,541 | 4/1991 | Audaire et al. | |
| 5,045,702 | 9/1991 | Mulleer. | |

FOREIGN PATENT DOCUMENTS

| | | | |
|---|---|---|---|
| 63-32328 | 2/1988 | Japan . | |
| 6-147979 | 5/1994 | Japan | 250/338.3 |
| 6-194228 | 7/1994 | Japan | 250/338.3 |

*Primary Examiner*—Edward J. Glick
*Attorney, Agent, or Firm*—Lowe, Price, LeBlanc & Becker

[57] ABSTRACT

A pyroelectric infrared ray sensor is disclosed. The pyroelectric sensor includes first and second reflecting electrodes formed on a face of the pyroelectric material. Further, first and second optical receiving electrodes are formed on an opposite face of the pyroelectric material correspondingly with the reflecting electrodes. Further, an impedance matching circuit is formed for extracting signals from the first and second reflecting electrodes, and the impedance matching circuit includes an input resistor. The input resistor of the impedance matching circuit includes first and second resistance electrodes extending from the first and second reflecting electrodes to be approachingly overlapped. A pyroelectric material resistance area consists of a sharing area in an overlapping portion of the first and second resistance electrodes.

16 Claims, 2 Drawing Sheets

PYROELECTRIC INFRARED RAY SENSOR

FIELD OF THE INVENTION

The present invention relates to a pyroelectric infrared ray sensor sensing a moving or a temperature varying object in a non-contacting manner by sensing the infrared rays radiated from the object, and, more particularly to a pyroelectric infrared ray sensor in which first and second reflecting electrodes are extended to be overlapped, and the resistance of the overlapped pyroelectric portion between the reflecting electrodes is utilized so as to form a load resistance, thereby making it possible to reduce the size of the pyroelectric infrared ray sensor.

BACKGROUND OF THE INVENTION

In a pyroelectric material in which a spontaneous polarization has been formed by being polarized in advance, the surface charges caused by the spontaneous polarization are neutralized by floating charges of the atmosphere at normal times. However, infrared rays are irradiated to the pyroelectric material, and the temperature of the pyroelectric material is varied as much as ΔT. In accordance with the temperature variation, the size of the spontaneous polarization are varied. However, the floating charges cannot respond to the temperature variation as fast as the spontaneous polarization, and therefore, the variation amount appears as the surface charges.

Thereafter, the initial neutral state is restored. If this variation of the surface charges is converted into signals, then a pyroelectric infrared ray sensor is formed.

The pyroelectric material is a signal source of a high impedance of $10^9$–$10^{12}$ Ω, therefore, if signals are to be extracted from the high impedance signal source, an impedance matching has to be carried out. Therefore, if a pyroelectric material of a large impedance is to be used as an infrared ray sensor, an impedance matching is carried out by connecting a field effect transistor as shown in FIG. 1, so that signals can be extracted from the pyroelectric material (which is the high impedance ($10^9$–$10^{12}$) signal source).

Thus the pyroelectric sensor is capable of sensing an object in a non-contacting manner by receiving infrared rays from the object and based on the variation of the surface charges.

This pyroelectric sensor can produce a pyroelectric output only when the object shows a variation in the infrared ray radiation. Therefore, it can detect only a temperature variation of an object or a moving object. In the case of an object other than a temperature varying body or as moving body, the incident infrared rays are chopped by means of a chopper so as to irradiate chopped infrared rays which are chopped into angular frequencies ω. In this way, voltage outputs which correspond to the unit infrared ray sensitivity can be obtained.

FIG. 1 illustrates the constitution of a conventional pyroelectric infrared ray sensor.

Referring to this drawing, a rear side 13 of a pyroelectric sensor 10 is provided with two reflecting electrodes 11 and 12. Another side 13' of the pyroelectric sensor 10 is provided with two optical receiving electrodes 11 and 12 which correspond to the reflecting electrodes 11 and 12, so that pyroelectric output can be obtained from the reflecting electrodes 11 and 12.

Further, two output terminals of the pyroelectric sensor 10 is connected through a wire 14 to a high resistance 21 which is provided on a substrate 20. The voltage drop between the pyroelectric sensor 10 and the high resistance 21 is compensated by carrying out an amplification by means of a field effect transistor 23.

An equivalent circuit for such a pyroelectric infrared ray sensor is illustrated in FIG. 2.

However, the above described conventional technique has the following disadvantages. That is, a high resistance 21 having a value of $10^{12}$ Ω is required, and a wire 14 for connecting the reflecting electrodes 11 and 12 of the pyroelectric sensor 10 to the high resistance 21 is required.

Particularly, the conventional sensor requires a high resistance, and therefore, the enlargement of the bulk cannot be avoided.

In an attempt to overcome the above described disadvantages, a study was made to use a thin film resistor. However, ruthenium oxide (RuO) was to be used for the thin film resistor, or a polysilicon having no impurity diffusion was to be used for the thin film resistor. In the former, it is impossible to miniaturize to make integral with the impedance matching circuit, while in the latter, the variation of the resistance is severe between $10^9$ and $10^{12}$ Ω, although it is suitable to miniaturize.

In an attempt to overcome this problems, Japanese Patent Laid-open No. Sho-63-32328 discloses a device constituted as follows. That is, an impedance matching circuit is formed upon a silicon substrate, and an input resistor is made to contain about 1% of Cr, thereby forming a thin film resistor having a resistance variation range of $10^8$–$10^{13}$ Ω.

However, in this pyroelectric sensor, an impedance matching circuit is formed upon a silicon substrate, and a wire bonding is carried out between the pyroelectric element and the input resistor. Therefore, a high precision technique is required in disposing the wire bonding between the semiconductor elements and the small devices.

SUMMARY OF THE INVENTION

The present invention is intended to overcome the above described disadvantages of the conventional techniques.

Therefore it is an object of the present invention to provide a pyroelectric infrared ray sensor in which the size of the sensor is reduced, ease of assembly is improved, and the structural constitution is novel.

It is another object of the present invention to provide a pyroelectric infrared ray sensor in which an input resistor of an impedance matching circuit is formed in the pyroelectric sensor, so that the increase of size due to the input resistor can be prevented.

In achieving the above object, the pyroelectric infrared ray sensor according to the present invention is characterized in that: an electrode is made to be extended from a reflecting electrode so as to be overlapped, and, by utilizing the resistance of a part of the overlapped portion of the pyroelectric material, a high input impedance is formed for using on a high impedance matching circuit integrally with the pyroelectric sensor having reflecting electrodes and optical receiving electrodes.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 3:
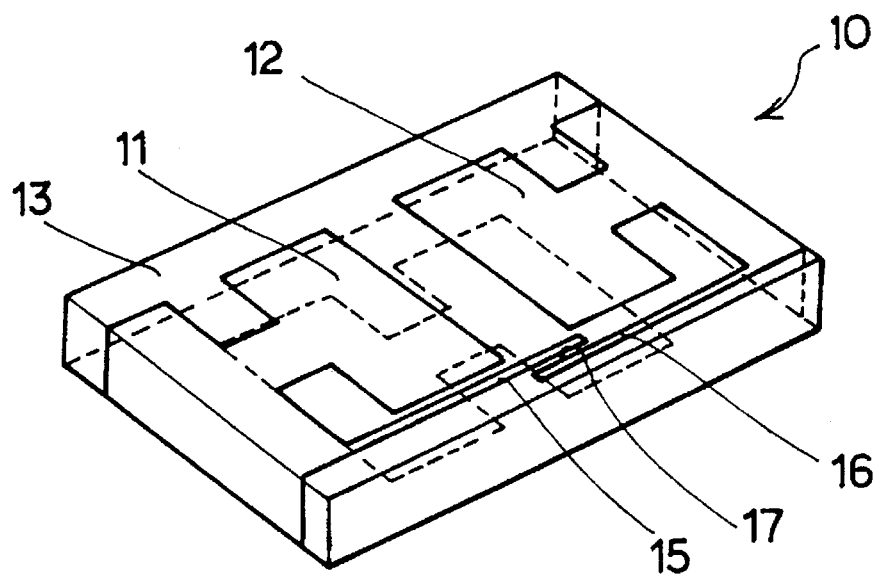
FIG. 3 is an illustration of the pyroelectric sensor according to the present invention.

FIG. 3 illustrates the structure of the pyroelectric sensor according to the present invention. Elements which are the same as those of FIG. 1 will be assigned the same reference numerals.

A pyroelectric sensor 10 includes first and second reflecting electrodes or sensors 11 and 12 on a rear side 13 thereof, and first and second optical receiving electrodes (shown in dotted lines in FIG. 1) on the other side thereof in corresponding locations with the first and second reflecting sensors 11 and 12. If infrared rays are incident on the optical receiving electrodes, the infrared rays pass through the pyroelectric sensor to disturb the polarization of the pyroelectric sensor. The disturbed amount of the pyroelectric polarization is proportional to the infrared ray energy, and therefore, the reflecting electrodes made of silver are provided, so that the infrared rays cannot pass through the pyroelectric sensor.

Figure 1:
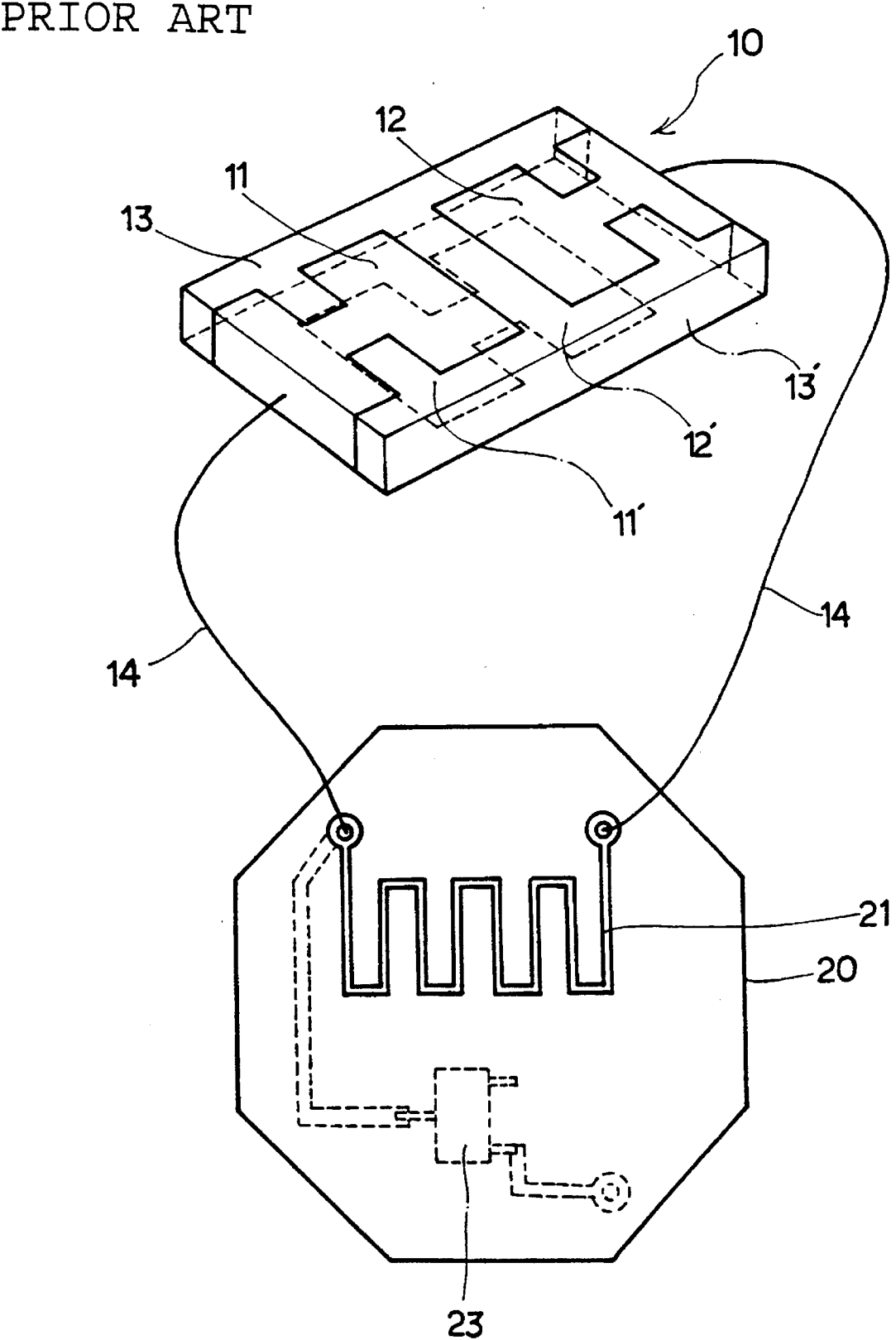
FIG. 1 is an illustration of a conventional pyroelectric sensor.
Figure 2:
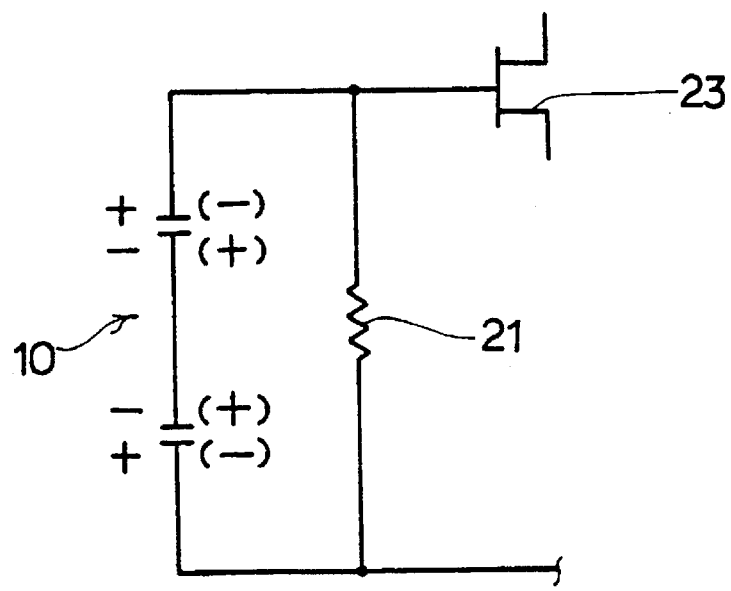
FIG. 2 is an equivalent circuit for the pyroelectric sensor.

Therefore, the infrared rays which are incident to the optical receiving electrodes cannot pass through the pyroelectric sensor, but are reflected by the reflecting electrodes, so that the polarization would be disturbed within the pyroelectric sensor. Due to the infrared rays which disturb the polarization, floating charges are generated. These floating charges are collected at the first and second reflecting electrodes 11 and 12, and, as shown in FIG. 1, are transferred through a wire 14 to a field effect transistor 23 which forms an impedance matching circuit. Conventionally, the input resistor 21 of the impedance matching circuit is formed on a substrate 20 separately from the pyroelectric sensor 10. However, according to the present invention, the input resistor is formed on the pyroelectric sensor 10.

On a part of the rear side 13 of the pyroelectric sensor 10 on which the first and second reflecting electrodes are formed, there extend first and second resistance electrodes 15 and 16 in a stripe shape in a mutually insulated and non-aligned manner.

Thus the ends of the first and second resistance electrodes 15 and 16 approach each other to form an overlapping portion, i.e., a sharing area portion 17. Here, a very high resistance is formed.

In the present invention, the sharing area portion 17 should preferably have a resistance value of 50 GΩ, more preferably 80–130 GΩ, and most preferably 100 GΩ.

If the resistance value is too small, the potential difference becomes small, and therefore, effective signals cannot be obtained. On the other hand, if the resistance value is too large, signals other than effective signals are generated. Therefore, the resistance value should desirably be the above mentioned level.

The distance between the first and second resistance electrodes 15 and 16 will be indicated by δ, and the overlapping cross-sectional area between the first and second resistance electrodes 15 and 16 will be indicated by A. Then the following relationship can be established.

Resistance Ra=ρδ/A where ρ indicates the resistivity.

The resistances which are obtained from the first and second resistance electrodes 15 and 16 and from the sharing area portion 17 can be varied by adjusting the distance 6 between the first and second resistance electrodes 15 and 16, or by adjusting the cross-sectional area A of the overlapping portion between the first and second resistance electrodes 15 and 16.

The pyroelectric materials include Pb(Li-Zr)TiO$_3$ series, PbLiTiO$_3$ series, and PbZrTiO$_3$ series materials. In the present invention, the resistivity of the pyroelectric materials is widely varied in accordance with the composition ratio. Therefore, after providing a particular resistivity, the desired resistance is obtained by varying the thickness of the pyroelectric material, the overlapping length of the first and second resistance electrodes, and the distance between the first and second resistance electrodes.

Meanwhile, the present invention can be applied to the general pyroelectric infrared ray sensor.

The pyroelectric infrared ray sensor is classified into: a thin film type pyroelectric infrared ray sensor having a thickness of 1–2 µm, and a bulk type pyroelectric infrared ray sensor having a thickness of 10–120 µm.

In a preferred embodiment of the pyroelectric infrared ray sensor according to the present invention, the overlapping distance of the two electrodes is 0.5–3.5 mm, so that the manufacturing would become easy, and that a variation of the resistance value due to other factors can be accommodated. Meanwhile, the distance between the two resistance electrodes is 0.15–0.6 mm, so that the variation range for the resistance value would be decreased.

In the case of the thin film type pyroelectric infrared ray sensor, as an example, the overlapping distance of the two electrodes and the distance between the two electrodes are 0.5–0.7 mm and 0.15–0.3 mm respectively.

In the case of the bulk type pyroelectric infrared ray sensor, as an example, the overlapping distance of the two electrodes and the distance between the two electrodes are 0.8–1.2 mm and 0.3–0.4 mm respectively.

According to the present invention as described above, the input resistor of the impedance matching circuit is disposed in the pyroelectric sensor, and therefore, a separate substrate for disposing the high capacity resistor becomes needless, thereby making it possible to significantly reduce the size of the sensor. Thus the increase in the bulk and the increase in the number of components, which are caused in the conventional sensor due to the use of a separate substrate are overcome.

Further, according to the present invention, a large space becomes available owing to the elimination of the separate substrate, and therefore, reflecting electrodes and optical receiving electrodes can be formed in the newly created space, with the result that a high sensitivity sensor can be manufactured. Further, the wiring operation for connecting a wire between the pyroelectric sensor and the input resistor is not required, and therefore, the assembling defects can be minimized.

What is claimed is:

1. A pyroelectric infrared ray sensor comprising:
   a pyroelectric material;
   first and second reflecting electrodes formed on a face of said pyroelectric material;

first and second optical receiving electrodes formed on an opposite face of said pyroelectric material correspondingly with said reflecting electrodes; and an impedance matching circuit for extracting signals from said first and second reflecting electrodes, said impedance matching circuit including an input resistor, said input resistor of said impedance matching circuit comprising:

first and second resistance electrodes extending from said first and second reflecting electrodes to be approachingly overlapped; and a pyroelectric material resistance area consisting of a sharing area in an overlapping portion of said first and second resistance electrodes.

2. The pyroelectric infrared ray sensor as claimed in claim 1, wherein said pyroelectric material is selected from a group consisting of $PbZrTiO_3$ series pyroelectric materials, $PbLiTiO_3$ series pyroelectric materials, and $Pb(Li-Zr)TiO_3$ pyroelectric materials.

3. The pyroelectric infrared ray sensor as claimed in claim 1, wherein said sharing area has a resistance of 50 G$\Omega$.

4. The pyroelectric infrared ray sensor as claimed in claim 1, wherein said sharing area has a resistance of 80–130 G$\Omega$.

5. The pyroelectric infrared ray sensor as claimed in claim 1, wherein said pyroelectric material has a thickness of 1–2 µm, and an overlapping distance of, and a distance between, said first and second resistance electrodes are 0.5–0.7 mm and 0.15–0.3 mm respectively.

6. The pyroelectric infrared ray sensor as claimed in claim 5, wherein said sharing area has a resistance of 80–130 G$\Omega$.

7. The pyroelectric infrared ray sensor as claimed in claim 1, wherein said pyroelectric material has a thickness of 10–120 µm, and an overlapping distance of, and a distance between, said first and second resistance electrodes are 0.8–1.2 mm and 0.3–0.4 mm respectively.

8. The pyroelectric infrared ray sensor as claimed in claim 6, wherein said sharing area has a resistance of 80–130 G$\Omega$.

9. A pyroelectric infrared ray sensor comprising:

a pyroelectric material;

first and second reflecting electrodes formed on a face of said pyroelectric material;

first and second optical receiving electrodes formed on an opposite face of said pyroelectric material in corresponding locations with said reflecting electrodes;

first and second resistance electrodes extending from said first and second reflecting electrodes towards each other to define an overlapping portion; and a pyroelectric material resistance area consisting of a sharing area in said overlapping portion of said first and second resistance electrodes.

10. The pyroelectric infrared ray sensor as claimed in claim 9, wherein said pyroelectric material is selected from a group consisting of $PbZrTiO_3$ series pyroelectric materials, $PbLiTiO_3$ series pyroelectric materials, and $Pb(Li-Zr)TiO_3$ pyroelectric materials.

11. The pyroelectric infrared ray sensor as claimed in claim 9, wherein said sharing area has a resistance of 50 G$\Omega$.

12. The pyroelectric infrared ray sensor as claimed in claim 9, wherein said sharing area has a resistance of 80–130 G$\Omega$.

13. The pyroelectric infrared ray sensor as claimed in claim 9, wherein said pyroelectric material has a thickness of 1–2 µm, and an overlapping distance of, and a distance between, said first and second resistance electrodes are 0.5–0.7 mm and 0.15–0.3 mm respectively.

14. The pyroelectric infrared ray sensor as claimed in claim 13, wherein said sharing area has a resistance of 80–130 G$\Omega$.

15. The pyroelectric infrared ray sensor as claimed in claim 9, wherein said pyroelectric material has a thickness of 10–120 µm, and an overlapping distance of, and a distance between, said first and second resistance electrodes are 0.8–1.2 mm and 0.3–0.4 mm respectively.

16. The pyroelectric infrared ray sensor as claimed in claim 15, wherein said sharing area has a resistance of 80–130 G$\Omega$.

* * * * *